Patented July 12, 1949

2,475,872

UNITED STATES PATENT OFFICE 2,475,872

2 - ACYLAMINO-5-THIAZOLYLPHENYL SULFIDE AND PROCESS FOR MAKING SAME

Louis L. Bambas, Grosse Pointe Woods, Mich., assignor to Parke, Davis & Company, Detroit, Mich., a corporation of Michigan No Drawing. Application June 13, 1944,
Serial No. 540,138

10 Claims. (Cl. 260—302)

The invention relates to the manufacture of organic sulfur compounds containing both an aryl radical and a heterocyclic radical such as thiazole and thiodiazole, which compounds are either of themselves valuable as therapeutic agents or are useful as intermediates in the preparation of other derivatives which have therapeutic properties.

This application is a continuation-in-part of my copending application, Serial No. 422,904, filed December 13, 1941.

I have devised a method for manufacturing compounds having the representative formula,

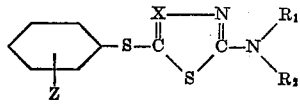

when Z is H, Cl, Br, $NO_2$, NHAc, X is $\equiv$CH, $\equiv$C—$CH_3$ or $\equiv$N and $R_1$ is H or alkyl and $R_2$ is H, alkyl,

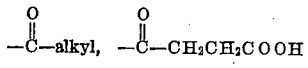

My method is based on the discovery that when a benzene sulfenyl is reacted with a 2-amino thiazole or a 2-amino thiodiazole and the reaction product is subjected to heat in the presence of acetic anhydride or other equivalent agent, a rearrangement takes place which may be illustrated as follows:

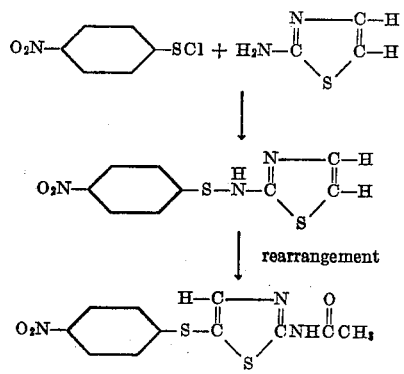

My invention may be illustrated by the following typical examples.

*Example 1.*—Preparation of 2-acetylamino-4'-nitro-5-thiazolylphenyl sulfide

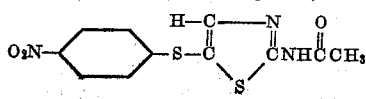

p-Nitrobenzene sulfenyl chloride may be prepared from 4,4'-dinitro diphenyl sulfide by the method of T. Zincke and S. Lenhardt, Ann. 400 2, (1913).

1430 grams of 2-amino thiazole is dissolved in one gallon of glacial acetic acid. This solution is cooled (20–40° C.) while a solution of 1400 grams of p-nitrophenyl sulfenyl chloride dissolved in 1 gallon of glacial acetic acid is added. Subsequently 1500 cc. of acetic anhydride is added and the solution is kept at a temperature of 85–90° C. for 24 hours to complete the rearrangement. A precipitate forms which is filtered off and then recrystallized from dioxane to give pure 2-acetylamino-4'-nitro-5-thiazolylphenyl sulfide of melting point 273–275° C.

In the above process the initial reaction forms the intermediate compound 4-nitro-phenyl sulfen-2'-amino thiazole which, however, is not isolated. Heat is necessary to cause its rearrangement to 2-amino-4'-nitro-5-thiazolylphenyl sulfide. The optimum temperature is about 85–90° C. at which about 80% of the rearrangement takes place in two hours. At lower temperatures, the rearrangement requires a longer time. At higher temperatures slight decomposition of the reaction product takes place, which however may not be wholly objectionable.

Acetic anhydride, while unnecessary to produce some rearrangement and the formation of the free amino compound, (2-amino-4'-nitro-5-thiazolylphenyl sulfide) is nevertheless desirable since it performs several functions in the rearrangement. It catalyzes the reaction according to the concentration of acetic anhydride present. The reaction is very rapid in the presence of acetic anhydride alone. The acetic anhydride also serves to acylate the free amino compound and the acylated compound is precipitated out of solution and therefore is readily separated from the other reactants. This precipitation serves as an indicator as to the course of the reaction. Acylation of the amine is also desirable when the compound is to be used as an intermediate for forming derivatives by a subsequent reaction where amino groups must be protected as in the oxidation of the sulfide to a sulfone as hereinafter described.

Instead of using acetic anhydride, other anhydrides may be used such as propionic anhydride or succinic anhydride or other acylating agents.

Instead of using glacial acetic acid as the solvent for the reactants, many other solvents may be used such, for example, as chloroform, ether, trichlorethylene or ethylene dichloride. The solvent may then be evaporated off and the anhydride added for the rearrangement or the anhydride may be added to the reaction mixture in the solvent for the rearrangement step.

If desired, a reagent may be added to take up the hydrogen chloride liberated in the reaction. Pyridine, triethylamine or sodium acetate may be used for this purpose but I have found it preferable to use merely an excess of 2-amino thiazole.

Where the compound formed in the reaction is to be subsequently oxidized to the corresponding sulfone, it is not necessary that it be purified by recrystallization. Preferably, however, the reaction mixture is stirred during the heating step since this facilitates a small crystal structure which is easier to oxidize. The reaction mixture is then either filtered directly or diluted with hot water and then filtered. The filter cake may be washed with hot alcohol. The crude material is obtained in high yields and although it may melt 20–25° lower than pure 2-acetyl amino-4'-nitro-5-thiazolylphenyl sulfide, it is entirely satisfactory for oxidation to the corresponding sulfone. This is described in my copending application, Serial No. 540,135 filed concurrently herewith, now Patent 2,389,126, issued November 20, 1945.

*Example 2.—Preparation of 2-succinylamino-4'-nitro-5-thiazolylphenyl sulfide*

By following the directions of Example 1 using succinic anhydride instead of acetic anhydride for the rearrangement, a compound is produced having the formula

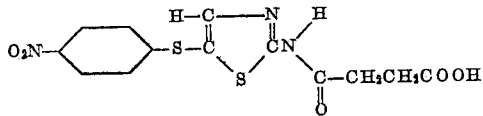

Other acid anhydrides may also be used for the acetic anhydride of Example 1 giving the corresponding 2-acylamino-4'-nitro-5-thiazolylphenyl sulfides.

*Example 3.—Preparation of 2-acetylamino-4-methyl-4'-nitro-5-thiazolylphenyl sulfide*

2-amino-4-methyl thiazole is prepared according to Blatt—Organic Synthesis Collective, vol. II, page 31. To a solution of 315 grams of this compound in 1 liter of glacial acetic acid is added 1400 grams of p-nitro benzene sulfenyl chloride, as in Example 1. The intermediate reaction product is not isolated but it is rearranged by heat in the presence of an anhydride, e. g. 300 cc. of acetic anhydride. The reaction mixture is heated on a steam bath to 85–90° C. for 15 hours. Crystals begin to appear in 30 minutes. The solution is cooled and the precipitate filtered off and washed with ethanol. The filter cake is recrystallized from hot dioxane to give 300 grams of 2-acetyl-amino-4-methyl-4'-nitro-5-thiazolylphenyl sulfide of melting point 174–177° C. It has the formula

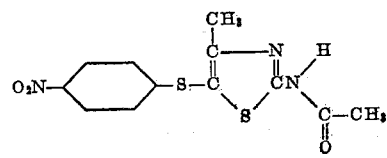

*Example 4.—Preparation of 2-acetylamino-4'-nitro-5-thiazolylphenyl sulfide* p-Nitro benzene sulfenyl chloride is reacted in benzene or other suitable solvent with an alkali metal alkanolate such as sodium ethanolate or sodium methanolate to obtain the corresponding p-nitro benzene sulfenyl alkanolate. This in turn is reacted with 2-amino-sulfathiazole to form the intermediate 4-nitro phenyl sulfen-2'-amino thiazole which is rearranged in accordance with Example 1 to form 2-acetylamino-4'-nitro-5-thiazolylphenyl sulfide. It has the formula

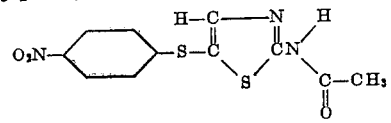

*Example 5.—Preparation of 2-acetylamino-5-thiazolylphenyl sulfide*

Instead of using p-nitro benzene sulfenyl chloride as the starting material as in Example 1, benzene sulfenyl chloride may be reacted with 2-amino thiazole and the resulting intermediate rearranged as in Example 1 to obtain 2-acetylamino-5-thiazolylphenyl sulfide. It has the formula

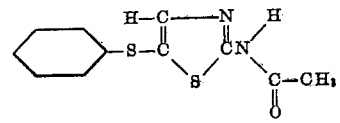

*Example 6.—Preparation of 2-acetylamino-4'-chloro-5-thiazolylphenyl sulfide*

In the same manner as Example 1, a 4-halobenzene sulfenyl halide such as 4-chloro-benzene sulfenyl chloride may be reacted with 2-amino thiazole and the product rearranged to obtain 2-acetylamino-4'-chloro-5-thiazolylphenyl sulfide. It has the formula

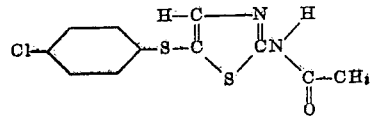

*Example 7.—Preparation of 2,4'-diacetylamino-5-thiazolylphenyl sulfide* p-Acetylamino benzene sulfenyl chloride is reacted with 2-amino thiazole and the intermediate rearranged as in Example 1 to obtain 2,4'-diacetylamino-5-thiazolylphenyl sulfide. It has the formula

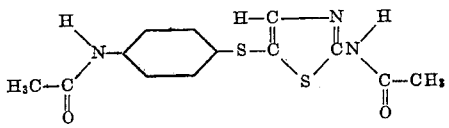

*Example 8.—Preparation of 2-acetyl methylamino-4-methyl-4' - nitro - 5 - thiazolylphenyl sulfide*

2-methylamino-4-methyl thiazole is made according to Traumann, Ann. 249, 43 and Young and Crooks J. Chem. Soc. 89 68.

To a solution of 315 grams of 2-methylamino-4-methyl thiazole in 1 liter of glacial acetic acid is added the p-nitro benzene sulfenyl chloride from 190 grams of 4,4'-dinitro diphenyl disulfide. The solution warms up and 300 cc. of acetic anhydride is added. The reaction is heated on a steam bath to 85–90° C. for 15 hours. Crystals begin to precipitate out of solution in ½ hour.

The solution is cooled and the precipitate is filtered off and washed with ethanol. The filter cake is recrystallized from hot dioxane to give 300 grams of 2-acetyl-methylamino-4-methyl-4′-nitro-5-thiazolylphenyl sulfide of M. P. 188–190° C. It has the formula

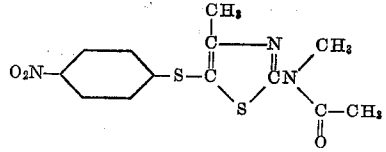

*Example 9.—Preparation of 2-acetylamino-4′-nitro-5-thiodiazolylphenyl sulfide*

This compound may be prepared in the same manner as in Example 1 by substituting 2-amino thiodiazole for 2-amino thiazole. 2-amino thiodiazole is reacted with p-nitro phenyl sulfenyl chloride in glacial acetic acid and acetic anhydride and the solution kept at 85–90° C. for 24 hours. 2-acetylamino-4′-nitro-5-thiodiazolylphenyl sulfide is precipitated. It has the formula

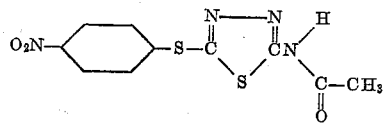

The above examples are given by way of illustration only and other compounds may be prepared by reacting a compound of the following general formula or the reactants tending to produce such compound

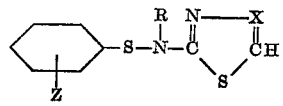

where Z and X have the significance previously described and R is H or lower alkyl, with an acid anhydride and heat to cause a rearrangement to a compound having the formula

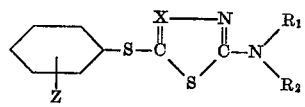

where X, Z, $R_1$ and $R_2$ have the significance previously described.

The organic sulfide compounds produced in accordance with my invention may be oxidized to the corresponding sulfones and further reacted to change the substituents Z, $R_1$ and $R_2$ as set forth in my Patent No. 2,389,126 above referred to.

What I claim as my invention is:

1. The method of preparing an organic sulfur compound which comprises reacting a compound having the formula

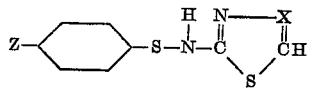

with a lower alkyl acylating agent and heat to cause a rearrangement with the formation of a compound having the formula

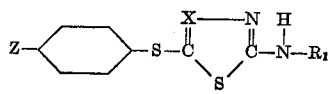

where Z is a member of the class consisting of H, Cl, Br, $NO_2$ and

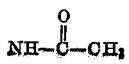

and X is a member of the class consisting of ≡CH, ≡C—alkyl and ≡N and $R_1$ is a member of the class consisting of

and

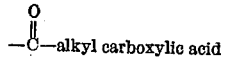

2. The method of preparing an organic sulfur compound which comprises reacting a phenyl sulfenyl compound of formula

where Z is a member of the class consisting of H, Cl, Br, $NO_2$ and

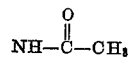

and Y is a halogen capable of condensing with an amino group, with an amino heterocyclic compound of formula

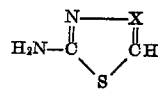

where X is a member of the class consisting of ≡CH, ≡C—alkyl and ≡N in the presence of a lower alkyl acylating agent and heat thereby causing a rearrangement with the formation of a compound having the formula

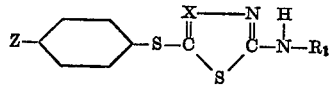

where $R_1$ is the radical of said acylating agent.

3. The method of preparing organic sulfur compounds which comprises reacting a phenyl sulfen-2-aminothiazole with a lower alkyl acylating agent and heat to cause a rearrangement with the formation of a 2-acylamino-5-thiazolylphenyl sulfide.

4. The method of preparing organic sulfur compounds which comprises reacting a phenyl sulfenyl halide and a 2-aminothiazole in the presence of a lower alkyl acylating agent and heat, thereby causing a rearrangement with the formation of a 2-acylamino-5-thiazolylphenyl sulfide.

5. The method of preparing a compound which comprises reacting a compound having the formula

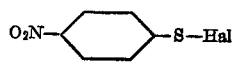

with an amino heterocycle of formula

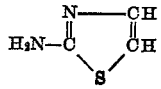

in the presence of a lower alkyl acylating agent at a temperature and for a time sufficient to produce a compound having the formula

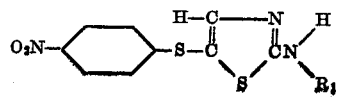

where Hal is a halogen capable of condensing with the amino group of said heterocycle and $R_1$ is a member of the class consisting of

and

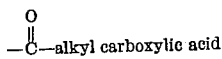

6. The method of preparing 2-acetylamino-4'-nitro-5-thiazolylphenyl sulfide which comprises reacting p-nitro phenyl sulfenyl chloride and 2-aminothiazole in the presence of acetic anhydride at a temperature about 85–90° C.

7. A compound having the formula

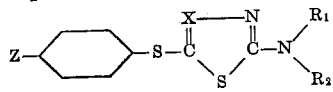

where Z is a member of the group consisting of H, Cl, Br, $NO_2$ and

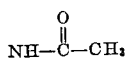

X is a member of the group consisting of $\equiv CH$, $\equiv C-CH_3$ and $\equiv N$ and $R_1$ is a member of the class consisting of H and alkyl and $R_2$ is a member of the group consisting of H, lower alkyl,

and

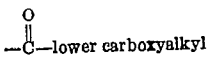

8. A compound having the formula

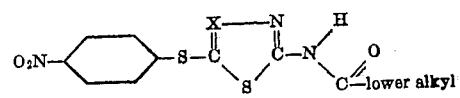

where X is a member of the group consisting of $\equiv CH$, $\equiv C-CH_3$ and $\equiv N$.

9. A compound having the formula

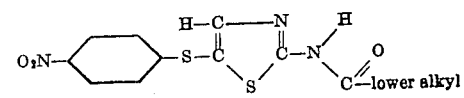

10. 2 - acetylamino - 4' - nitro - 5 - thiazolylphenyl sulfide having the formula

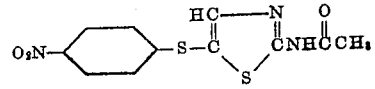

LOUIS L. BAMBAS.

REFERENCES CITED

The following references are of record in the file of this patent:

UNITED STATES PATENTS

| Number | Name | Date |
|---|---|---|
| 2,328,548 | Dohrn et al. | Sept. 7, 1943 |